United States Patent [19]

Yamanaka

[11] 4,071,853

[45] Jan. 31, 1978

[54] SOLID STATE TELEVISION CAMERA

[75] Inventor: Seisuke Yamanaka, Mitaka, Japan

[73] Assignee: Sony Corporation, Tokyo, Japan

[21] Appl. No.: 561,922

[22] Filed: Mar. 25, 1975

[30] Foreign Application Priority Data

Mar. 29, 1974  Japan .................................. 49-35281
July 22, 1974  Japan .................................. 49-83900

[51] Int. Cl.² ............................................ H04N 9/04
[52] U.S. Cl. .......................................... 358/41; 358/44; 358/213
[58] Field of Search .................... 358/41, 43, 44, 213; 250/211 J; 307/221 D; 357/24, 30; 178/7.1

[56] References Cited

U.S. PATENT DOCUMENTS

| 3,717,724 | 2/1973 | Montgomery | 358/43 |
| 3,717,770 | 2/1973 | Dyck et al. | 250/211 J |
| 3,777,061 | 12/1973 | Takemura | 178/7.1 X |
| 3,876,989 | 4/1975 | Bankowski et al. | 307/221 D X |

Primary Examiner—Howard W. Britton
Assistant Examiner—Mitchell Saffian
Attorney, Agent, or Firm—Hill, Gross, Simpson, Van Santen, Steadman, Chiara & Simpson

[57] ABSTRACT

A solid state television camera, employing a charge-coupled device with image sensing cells aligned in both the horizontal and vertical directions. The positions of image sensing cells in one horizontal scanning line are shifted 180° relative to those of the adjacent horizontal scanning line. Upon reading out image information, read-out signals of every other line are delayed by 180°; then the image information of two adjacent horizontal scanning lines are mixed, whereby a sampling error is avoided.

10 Claims, 27 Drawing Figures

SOLID STATE TELEVISION CAMERA

BACKGROUND OF THE INVENTION

1. Field of the Invention

This invention relates generally to solid state cameras, and more particularly to such a solid state camera which employs a charge transfer device.

2. Description of the Prior Art

In devices using solid state sensors such as charge-coupled devices, hereinafter referred to as a CCD, as image pickup devices of a television camera, light information is converted into electric signals which is sampled at every picture element. If it is assumed that the sampling frequency is $f_c$, the alignment pitch, $\tau_H$, of the picture elements in the horizontal direction is $1/f_c$. The electric charges stored in the respective picture elements are finally transferred to an output terminal at the rate of a clock pulse frequency and derived as a form of serial video signals. The resultant video signal $S_y$ contains DC components $S_{DC}$ and side band components $S_{SB}$ of sampling frequency $f_c$ modulated with the DC components $S_{DC}$. In this case, there are upper and lower side band components $S_{SB}$ of the sampling frequency $f_c$.

If the frequency band of the DC component $S_{DC}$ is selected sufficiently wide so as to increase the resolution, higher band components $S_{DH}$ of the DC component $S_{DC}$ are superimposed on the side band component $S_{SB}$ of the sampling frequency $f_c$ and hence a sampling error results. If a picture is reproduced from the above video signal as it is, a flicker is caused in the reproduced picture. Since this flicker is caused by the sampling error, the flicker can be avoided by restricting the frequency band of the DC component $S_{DC}$ to be smaller than one-half of the sampling frequency $f_c$ according to Nyquist's theorem. However, if the frequency band of the DC component In order to make the frequency band of the DC component $S_{DC}$ about 3.5 MHz without deteriorating the resolution and without sampling error, it is sufficient that the sampling frequency $f_c$ be selected sufficiently high. Since the sampling frequency $f_c$ is obtained by the product of $n \cdot f_H$ ($f_c = n \cdot f_H$) where $n$ is the number of picture elements in the horizontal direction of the CCDs and $f_H$ is the horizontal frequency of the television signal, if the sampling frequency $f_c$ is made high enough to remove the sampling error, the number $n$ of the picture elements must be increased correspondingly, with the result that the manufacturing of the CCDs becomes costly.

SUMMARY OF THE INVENTION

According to an aspect of this invention, a solid state camera is provided which comprises image sensing cells aligned in both horizontal and vertical directions, wherein positions of the respective image sensing cells of the horizontal scanning line are shifted by one-half the alignment pitch relative to those of the next horizontal scanning line. Means are provided for projecting an image on said image sensing cells, for reading out image information stored in said respective image sensing cells, for delaying said image information from said reading out means by one-half each reading cycle at every other horizontal scanning line means are available for mixing said image information of adjacent two horizontal scanning lines and for deriving an output signal from said mixing means.

By adding the signals from adjacent two horizontal scanning lines, side band components can be completely eliminated so that the resultant video signal consists of DC components only and hence the occurrence of sampling error can be prevented.

If color filter elements are arranged in response to respective picture elements, a so-called one chip CCD color camera can be formed.

Accordingly, it is an object of this invention to provide a novel solid state camera.

It is another object of the invention to provide a solid state camera which is less affected by sampling error.

It is a further object of the invention to provide a solid state camera which uses charge-coupled image sensor devices of one chip to eliminate sampling error.

It is a yet further object of the invention to provide one chip CCD camera which uses one chip CCD to reduce sampling error.

The other objects, features and advantages of the invention will become apparent from the following description taken in conjunction with the accompanying drawings.

DESCRIPTION OF THE PREFERRED EMBODIMENTS

Figure 1:
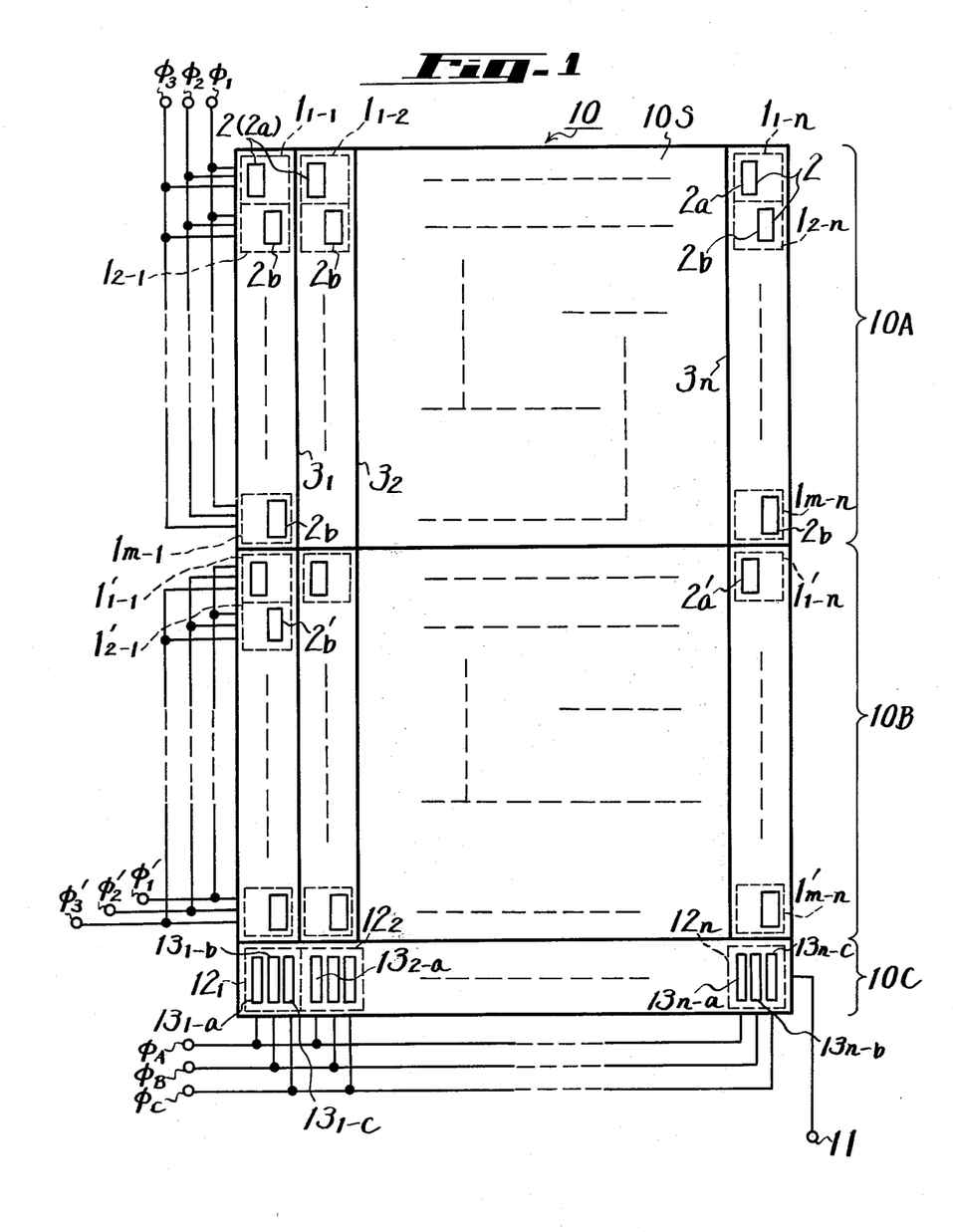
FIG. 1 is a schematic diagram showing an example of a CCD which is suitable for use with the invention.
Figure 2:
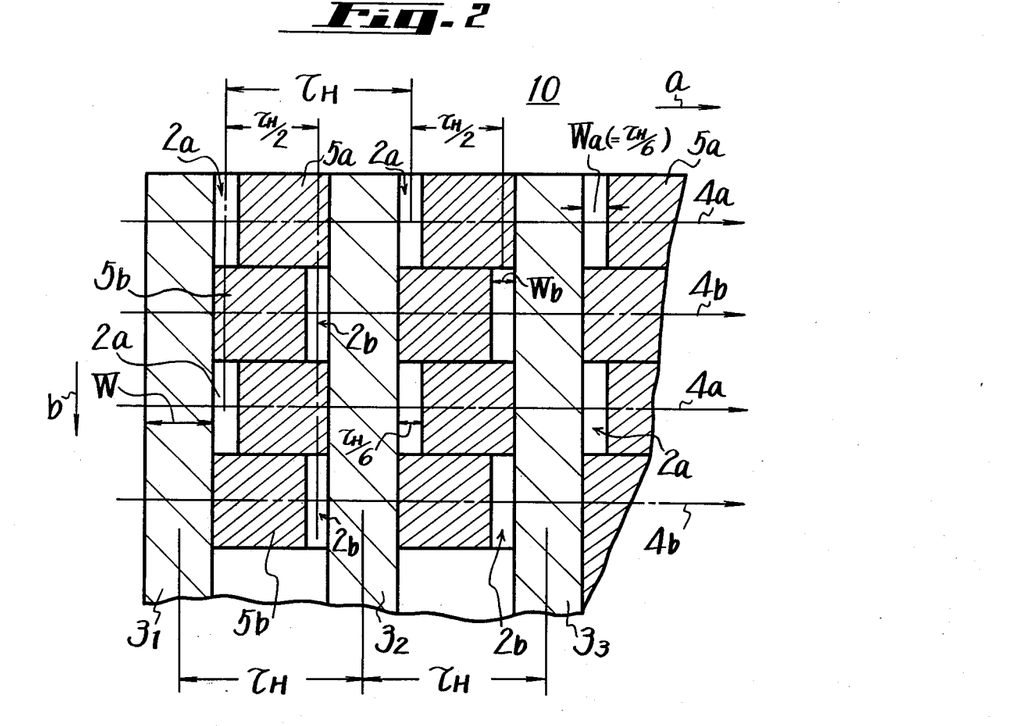
FIG. 2 is an enlarged plan view showing a part of the CCD shown in FIG. 1.

Solid state sensors such as 3-phase CCD useable in the invention are shown in FIGS. 1 and 2. A 3-phase CCD 10 consists of a photo sensitive array 10A on which a light image of an object (not shown in FIGS. 1 and 2) is projected. A temporary storage array 10B stores electric charges corresponding to the light information of the image and a read-out register 10C reads out video output signals. The arrays 10A, 10B and register 10C are formed on a semiconductor material such as a silicon substrate 10S. The photo sensitive array 10A has a suitable number of picture elements $1_{1\text{-}1}, 1_{1\text{-}2}, - 1_{m\text{-}n}$ aligned in the horizontal and vertical directions at a predetermined alignment pitch $\tau_H$ in the horizontal direction. Each of the picture elements $1_{1\text{-}1}, 1_{1\text{-}2}, -, 1_{m\text{-}n}$ has one photo sensing cell 2. The photo sensing cells of the picture elements on the odd number horizontal scanning lines are marked with 2a and those on the even number horizontal scanning lines are marked with 2b, respectively.

The light information of the image is converted to corresponding electric charges at parts of a semiconductor substrate 10S facing the photo sensing cells 2 which are connected with electrodes $\phi_1$, $\phi_2$ and $\phi_3$ supplied with image sensing biases having a predetermined potential. Therefore, if a well-known transfer clock pulse is applied to the electrodes $\phi_1$ to $\phi_3$, the electric charges stored in the semiconductor substrate 10S corresponding to the respective picture elements $1_{1-1}$, $1_{1-2}$, —, $1_{1-n}$, $1_{2-1}$, —, $1_{m-1}$, —, $1_{m-n}$ on the horizontal scanning lines are transferred to the temporary storage array 10B and stored at the positions corresponding to the horizontal scanning lines during the vertical blanking period sequentially at every horizontal scanning line. The temporary storage array 10B is formed similarly to the photo sensitive array 10A but is optically shielded as a whole. Therefore, parts of the temporary storage array 10B are shown by similar references numerals to those of the photo sensitive array 10A with a prime (').

The charges stored in the temporary storage array 10B are read out sequentially with a read-out clock pulse or sampling pulse applied to the read-out register 10C. Thus a video output signal is derived from an output terminal 11 connected to the read-out register 10C. The read-out register 10C has read-out elements $12_1$, —, $12_n$ aligned in the horizontal direction and corresponding in number to the picture elements of the array 10B or 10A in one horizontal scanning line. Since the reading out is done with 3-phase sampling pulses $\phi_A$, $\phi_B$ and $\phi_C$, the read-out elements $12_1$, —, $12_n$ have three read-out units $13_{1-a}$, $13_{1-b}$ and $13_{1-c}$, —, $13_{n-a}$, $13_{n-b}$ and $13_{n-c}$, respectively.

With the invention, the CCD 10 is so constructed that when the light image of the object is cast on the CCD 10, a phase difference of 180° is given between a read-out signal $S_o$ obtained from the odd number horizontal scanning line, and a read-out signal $S_E$ is obtained from the even number horizontal scanning line. The photo sensing cells 2 formed in the CCD 10 are arranged to satisfy the positional relationship shown in FIG. 2. At least from the viewpoint of space, a phase difference is given between the read-out signals $S_O$ and $S_E$. As shown in FIG. 2, if it is assumed that the alignment pitch of the picture elements $1_{1-1}$ to $1_{1-n}$ is taken as $\tau_H$ in the horizontal scanning direction, and the width of each of channel stops $3_1$, $3_2$, — $3_n$ formed in a horizontal scanning direction $a$ at every alignment pitch $\tau_H$ is taken as W, the width W is selected as one-third $\tau_H$. In this case, the distance between the photo sensing cells 2a and 2b, which must be formed in correspondence with the odd number horizontal scanning lines (refer to broken lines 4a in FIG. 2) and the even number horizontal scanning lines (refer to broken lines 4b in FIG. 2) in the regions divided by the plurality of channel stops $3_1$ to $3_n$, is selected as just $\tau H/2$.

In the example of FIG. 2, widths $W_a$ and $W_b$ of the photo sensing cells 2a and 2b are selected as $\tau H/6$, and the distance between the centers of the photo sensing cells 2a and 2b is selected as $\tau H/2$.

The picture element regions other than the photo sensing cells 2a and 2b are optically shielded with metal layers 5a and 5b such as aluminum.

The solid state camera according to the invention utilizes the CCD 10 described as above. The signal treatment system of an embodiment of the solid state camera according to this invention will now be described with reference to FIG. 3. The image of an object 14 is projected on the CCD 10 through a lens 15 and a read-out signal is obtained from the read-out register 10C. A read-out video signal $S(S_O, S_E)$ delivered to the output terminal 11 is applied to an adder circuit 25 through a switch SW, which is reversed at every horizontal scanning period, to be treated.

Figure 4A:
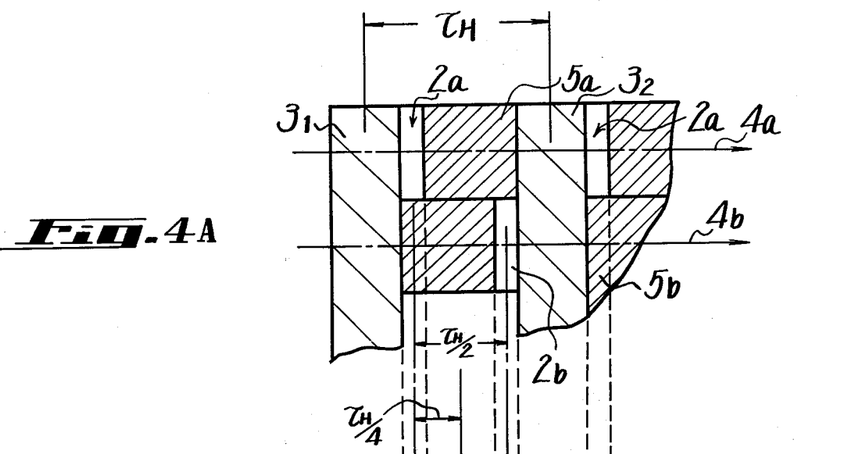
FIGS. 4A to 4E, inclusive, are diagrams used for explaining the system shown in FIG. 3.
Figure 4B:
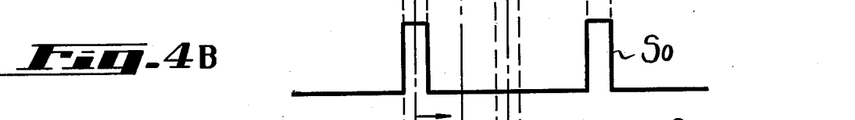
Figure 4C:
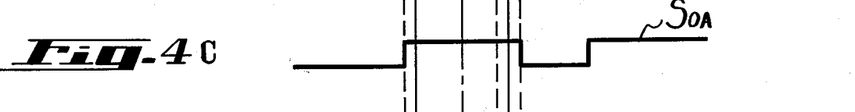
Figures 4D, 4E:
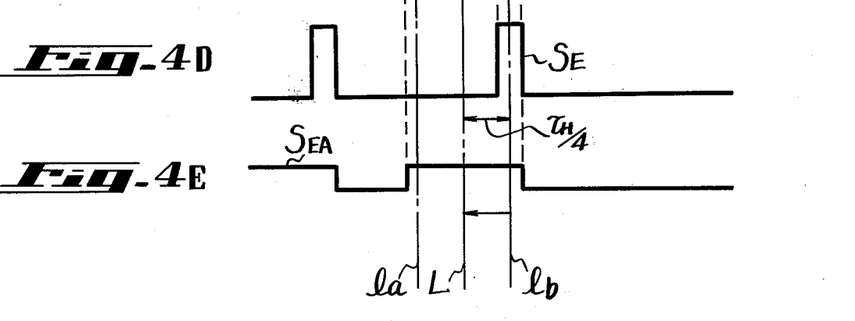

In this case, since the distance $\tau H/2$ is provided between the photo sensing cells 2a and 2b as shown in FIG. 2, it may be considered that if the odd and even number read-out signals $S_O$ and $S_E$ are read out sequentially, they are read out with the phase difference of 180° in time. However, they are read out with the same phase in time by the following reason. If the read-out signal $S_O$, corresponding to the light information cast on the photo sensing cells 2a on the odd number horizontal scanning line 4a as shown in FIG. 4A, is as shown in FIG. 4B, the read-out signal $S_E$ obtained from the photo sensing cells 2b becomes the signal FIG. 4D. In other words, if the state before the information being transferred is considered, the light information shifted by $\tau H/2$ is obtained. However, since the depletion region, which is produced in the semiconductor substrate under the photo sensing cells 2a and 2b, will extend over the substrate facing the picture element regions, the read-out signal $S_O$ shown in FIG. 4B is spread out as a signal $S_{OA}$ shown in FIG. 4C. The other read-out signal $S_E$ is also spread out as a signal $S_{EA}$ shown in FIG. 4E. Thus, the center $l_a$ of the read-out signal $S_O$ is displaced to a position $L(L - l_a = (\tau H/4))$, and similarly the center $l_b$ of the other read-out signal $S_E$ is displaced to the same position $L(l_b - L = (\tau H/4))$. From the viewpoint of phase relation in time, the former is delayed in phase by $(\tau H, 4)$ (90°) while the latter is ahead by the same value. As a result, they are displaced by $\tau H/2$ from the viewpoint of space, but upon transferring and reading out the signals or from the viewpoint of time, both the read-out signals $S_O$ and $S_E$ are obtained with the same phase relation.

Figure 3:
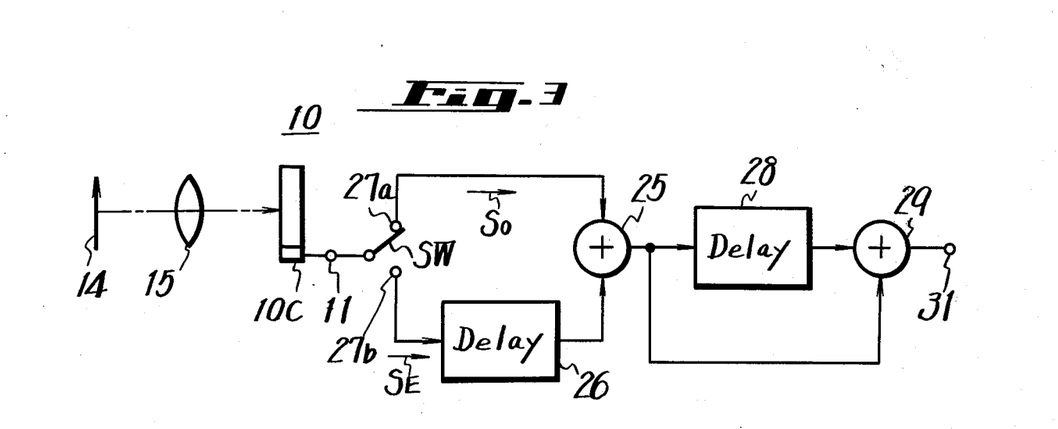
FIG. 3 is a systematic diagram showing a signal treatment system of an embodiment of the solid state camera according to the invention.

Therefore, in order to make the phase difference of $\tau H/2$ or 180° between both signals in view of time, the read-out signal $S_E$ is obtained at the even lines is delayed, and thereafter is applied to the adder circuit 25 shown in FIG. 3. In FIG. 3, reference numeral 26 indicates a delay circuit for delaying the signal $S_E$ by the value described above.

In the example of the invention shown in FIG. 3, when the movable contact of the switch SW contacts with one fixed contact 27a, the read-out signal $S_O$ at the odd lines is obtained. The read-out signals $S_O$ and $S_E$ obtained alternately at every horizontal scanning period are delayed by one horizontal scanning period (1H) through a delay circuit 28 and thereafter applied to an adder circuit 29 together with the read-out signals $S_O$ and $S_E$ which do not pass through the delay circuit 28.

Figure 5A:
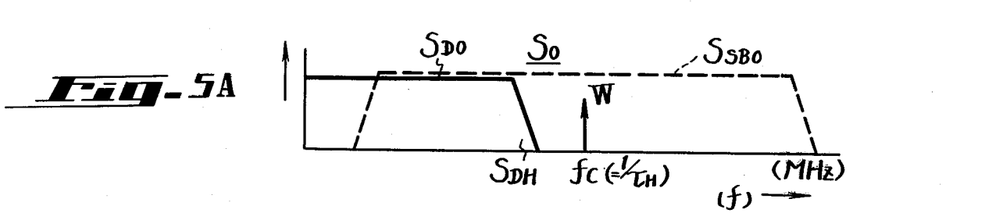
FIGS. 5A, 5B and 5C are frequency spectrum diagrams showing the relationship among side band components.
Figure 5B:
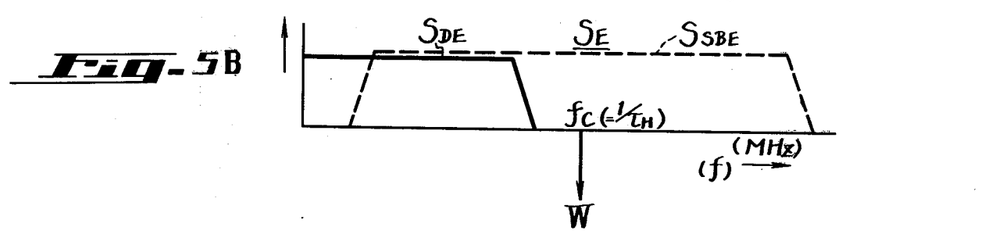
Figure 5C:
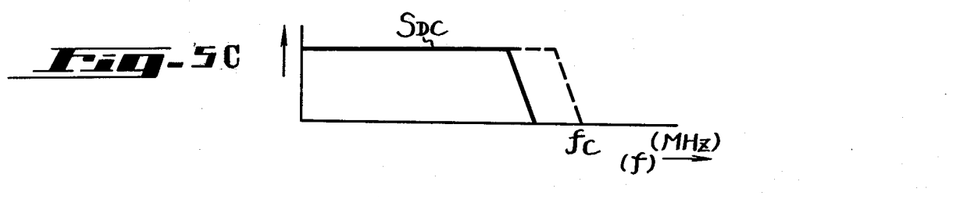

FIGS. 5A and 5B are spectrum diagrams showing the frequency spectra of the read-out signals $S_O$ and $S_E$ and phase relation to their side bands components, respectively. FIG. 5A shows the spectrum of the read-out signal $S_O$ which includes DC components $S_{DO}$ and the side band components $S_{SBO}$. In this case, a high band portion $S_{HO}$ of the DC components $S_{DO}$ is overlapped with the side band components $S_{SBO}$ to generate a sampling error. The spectrum of the read-out side band components $S_{SBE}$ is shifted from that of the side band components $S_{SBO}$ by 180° due to the delay circuit 26. In the embodiment of FIG. 3, since the read-out signals $S_O$ and $S_E$ during adjacent horizontal scanning periods are added in the adder circuit 29, the side band components $S_{SBO}$ and $S_{SBE}$, reversed in phase, are added to be cancelled. Thus, the spectrum of the added output signal becomes the DC component $S_{DC}$ without sampling error as shown in FIG. 5C. That is, if the adjacent read-out signals are added in the adder circuit, the side band components are eliminated under the existence of the vertical relative relation therebetween. As a result, the sampling error can be eliminated completely, and hence there may be proposed no problem even if the frequency band of the DC components $S_{DC}$ is expanded. That is, the frequency band of the effective DC components $S_{DC}$ can be easily expanded by the invention.

Figure 6:
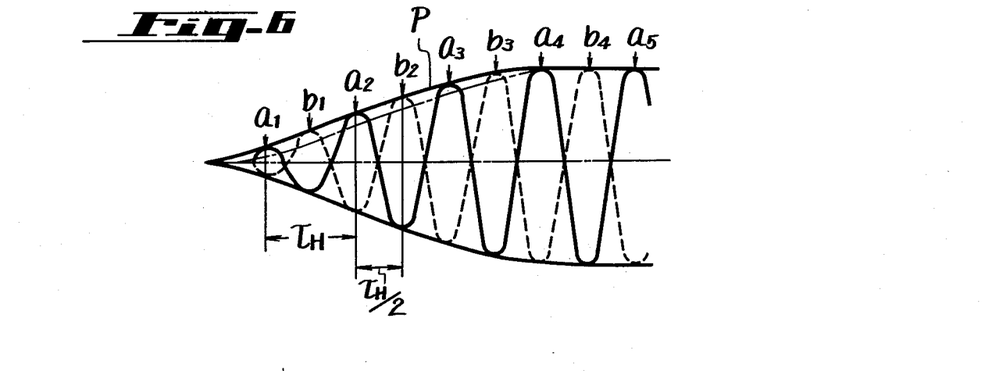
FIG. 6 is a waveform diagram used for explaining the system shown in FIG. 3.

The phenomenon that the side band components, which are different in phase, are eliminated by adding them is only possible under the condition that their levels are equal. In this invention, since the CCD 10 shown in FIGS. 1 and 2 is employed, the above condition is satisfied. If the side band components based upon the light informations corresponding to the image of the object 14 has an envelope shown by a curve $P$ in FIG. 6, the plurality of photo sensing cells $2a$ on the certain odd number horizontal scanning line produce signal levels at points $a_1$, $a_2$, $a_3$, — in FIG. 6, while the plurality of photo sensing cells $2b$ on the even number horizontal scanning line produce signal levels at points $b_1$, $b^2b^3$ — shifted from the points $a_1$, $a_2$, $a_3$, - by $\tau H/2$, respectively. Thus, an envelope formed by composing the above informations can be shown by the curve $P$ in FIG. 6 as described just above. The wave form shown by a solid line in FIG. 6 is the fundamental wave of the side band components $S_{SBO}$ in the signal $S_O$, and that shown by the dash line is the fundamental wave of the side band components $S_{SBE}$ in the signal $S_E$. Due to the delay circuit 26, the phase difference of 180° exists between both the signals. Accordingly, if the above different signals are added in the adder circuit 29, it produces no output signal because their phases are reversed. In FIG. 3, an output terminal 31 leads from the adder circuit 29.

In a case where the signals are not displaced by $H/2$ in space but displaced by $\tau H/2$ in time or wherethe positional relation of the photo sensing cells 2 is not particularly selected and the photo sensing cells 2 produce one of the information groups at the points $a_1$, $a_2$, $a_3$, — and $b_1$, $b_2$, $b_3$ — in space, if the signal $S_E$ is only displaced in time, the envelope of the signal $S_E$ obtained can be shown by the broken line in FIG. 6. Therefore, if the envelopes shown by the solid line and broken line are combined, there is produced an output signal which is not zero and hence the side band components cannot be eliminated. That is, even if there exists the vertical correlation of video signals between adjacent two successive lines, the sampling error cannot be removed completely and accordingly a flicker in the reproduced picture cannot be removed. In addition thereto, the band of the DC components cannot be expanded. According to this invention, such defects can be avoided completely, as described above.

In the example of FIG. 3, since the read-out signals $S_O$ and $S_E$ obtained during the adjacent horizontal scanning periods are added all over their frequency band to produce a desired video signal, the resolution, especially in the vertical direction is lowered by one-half.

Figure 7:
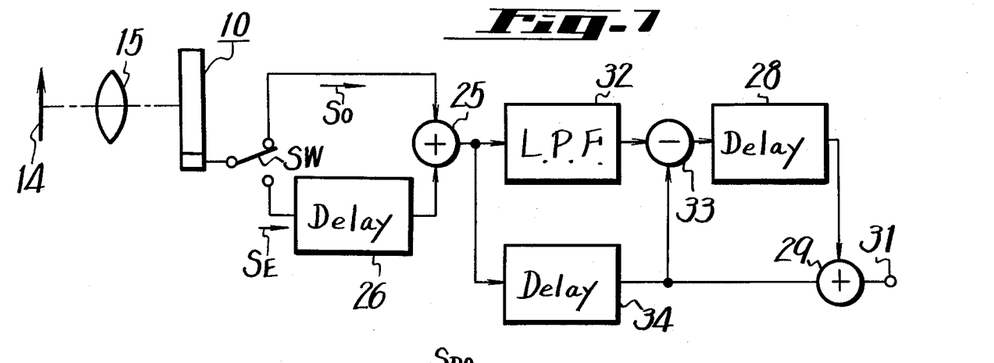
FIG. 7 is a systematic diagram showing another embodiment of the invention.
Figure 8A:
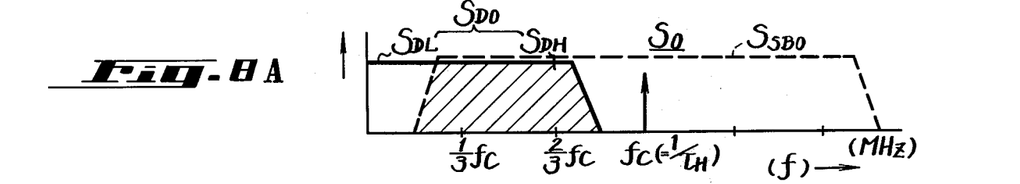
FIGS. 8A to 8E, inclusive, are frequency spectrum diagrams used for explaining the embodiment shown in FIG. 7.
Figure 8B:
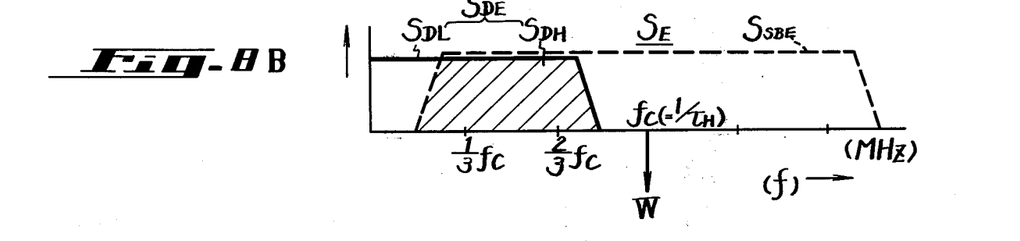
Figure 8C:
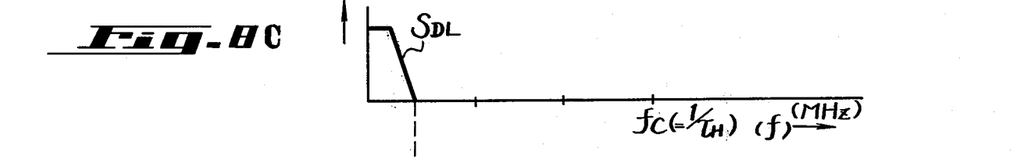
Figure 8D:
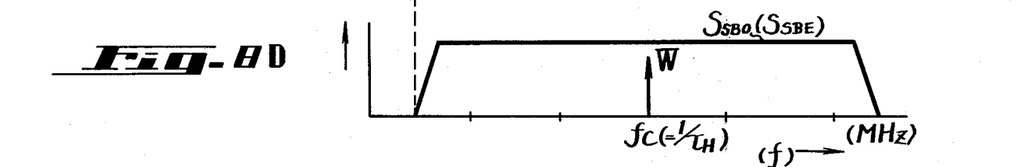
Figure 8E:
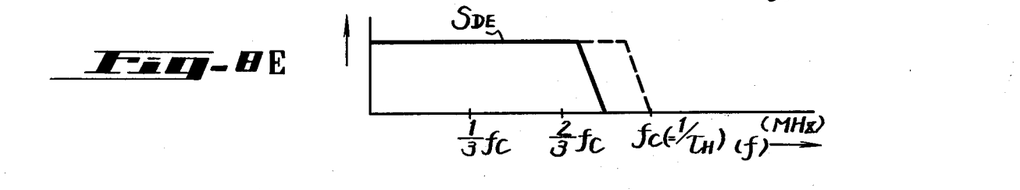

FIG. 7 shows another embodiment of this invention which avoids the lowering of the resolution in the vertical directions in which reference numerals are the same as those in FIG. 3 to designate like elements, and hence their description will be omitted. In the embodiment of FIG. 7, the read-out signals $S_O$ and $S_E$ shown in FIGS. 8A and 8B are obtained alternately at every horizontal scanning period and are fed to a low pass filter 32 having an output signal which is fed to a subtractor circuit 33 together with the read-out signals $S_O$ and $S_E$. The low pass filter 32 permits the passage of a part $S_{DL}$ of the DC components $S_{DO}(S_{DE})$ which may affect the resolution therethrough, said part $S_{DL}$ not being overlapped with the side band components. The part $S_{DL}$ of the DC component is shown in FIG. 8C. In FIG. 7, a delay circuit 34 serves to compensate for the time delay caused in the low pass filter 32. Since the output signal from the subtractor circuit 33 has a band width shown in FIG. 8D, the output signal from the subtractor 33 is fed to the delay circuit 28 to be delayed by one horizontal scanning period, and then fed to the adder circuit 29 to carry out the treatment of the read-out signals of the adjacent horizontal scanning periods. Thus, the side band components $S_{SBO}$ ($S_{SBE}$) are eliminated, and the resultant video signal consists of only the DC component $S_{DO}$ ($S_{DE}$), as shown in FIG. 8E. The resultant video signal is delivered to the output terminal 31. In this case, the low band part of the DC component of the output video signal is used without being treated, so that the resolution in the vertical direction is not substantially lowered.

It will be apparent that if three of the systems as shown in FIG. 3 are suitably combined with red, green and blue color filters, a color video signal without sampling error will result.

Figure 9:
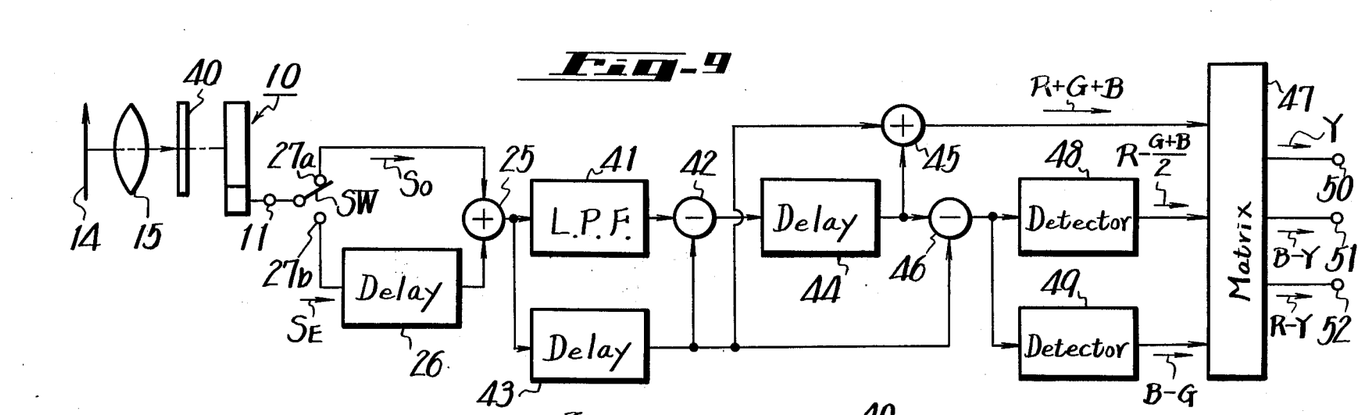
FIG. 9 is a systematic diagram showing a further embodiment of the invention.
Figure 10:
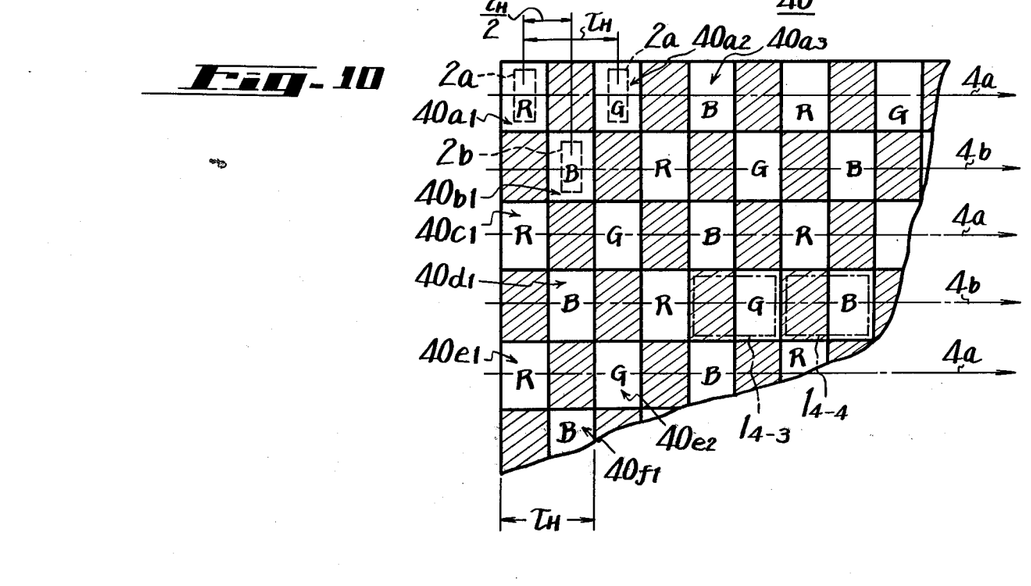
FIG. 10 is a partial plan view of a color filter which is useable in the invention.

FIG. 9 shows a solid state color camera of the invention in which one CCD 10 is employed and a specific color filter 40 shown in FIG. 10 is used. The color filter 40 includes a plurality of color filter elements in correspondence with the picture elements of the photo sensitive array 10A, the color filter elements of the color filter 40 being aligned corresponding to the photo sensing cells $2a$ and $2b$. As shown in FIG. 10, the color filter elements $40_{a1}$, $40_{a2}$, —, $40_{b1}$, —, each of which has a width $\tau H/2$, are formed, and the other areas (refer to the cross hatched parts in FIG. 10) are made to be light shielding portions. The color selectivities of the color filter elements $40_{a1}$, $40_{a2}$, —, $40_{b1}$, — are so selected that they pass the desired primary colors. That is, the red color light (R), green color light (G) and blue color light (B) are passed through the color filter elements, alternately and sequentially in the horizontal scanning direction with a predetermined repetition frequency.

The color filter elements in, for example, the odd number horizontal scanning line $4a$ are selected such that 1st, 4th, 7th, — color filter elements $40_{a1}$, $40_{a4}$, $40_{a7}$, — in the horizontal scanning direction a pass red color light, 2nd, 5th, 8th, — color filter elements $40_{a2}$, $40_{a5}$, $40_{a8}$ pass green color light, and 3rd, 6th, 9th, — color elements $40_{a3}$, $40_{a6}$, $40_{a9}$, — pass blue color light.

The position of the color filter elements in the even number horizontal scanning line are so selected that the phase of the side band components $S_{SBE}$ in the read-out signal $S_E$ obtained from the color filter elements is displaced by $\rho$ from the phase of the side band components $S_{SBO}$ in the read-out signal $S_O$ obtained by scanning the odd number horizontal scanning line $4a$. Therefore, as shown in FIG. 10, in the even number horizontal scanning line 4b, the color filter elements pass color light displaced by p from the color light passed through the color filter elements in the odd number horizontal scanning line 4a.

If the color filter 40 constructed as above is used, a color decomposed image of the object is obtained on the CCD 10. In the embodiment of the invention shown in FIG. 9, the above mentioned color filter 40 and CCD 10 are combined to provide a desired solid state color camera. In FIG. 9, reference numerals same as those used in FIG. 3 designate the same elements and their description will be omitted.

FIGS. 11A to 11G show the phase relations among the side band components of the frequency spectrum R, G and B in the read-out signals $S_O$ and $S_E$, respectively.

In the example of FIG. 9, the read-out signals $S_O$ and sequentially at every one horizontal scanning period (1H) are fed to a low pass filter 41 which pass a desired band of components (refer to FIG. 11C), and then are fed to a first subtractor circuit 42 which is also supplied with read-out signals $S_O S_E$ having bands which are not limited to carry out the signal treatment. Thus, the output signal from the subtractor circuit 42 is a signal $S_{SBO}$ (or $S_{SBE}$) containing the high band component $S_{DHO}$ (or $S_{DHE}$) of the DC components $S_{DC}$ in its low band side (refer to FIG. 11D). In this case, a delay circut 43 is provided between the adder circuit 25 and the subtractor circuit 42 so as to compensate for the delay time caused by the low pass filter 41.

Figure 11A:
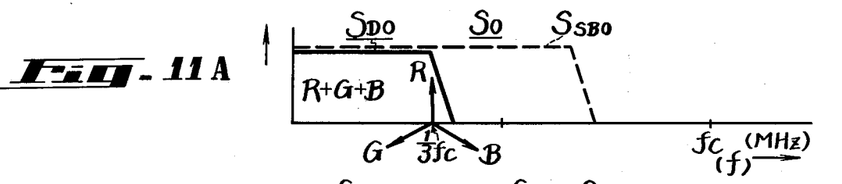
FIGS. 11A to 11E, inclusive, are frequency spectrum diagrams of side band components.
Figure 11B:
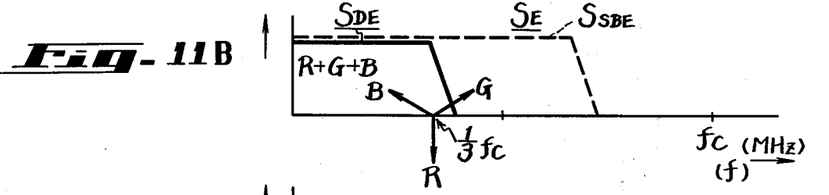
Figure 11C:
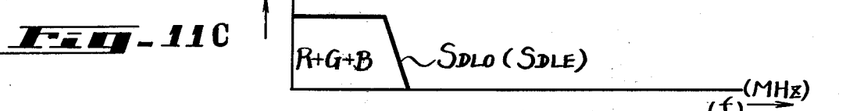
Figure 11D:
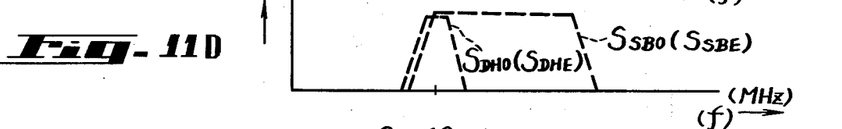
Figure 11E:
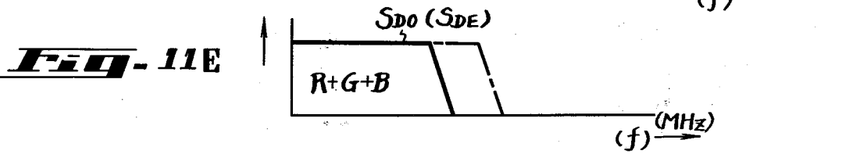
Figure 11F:
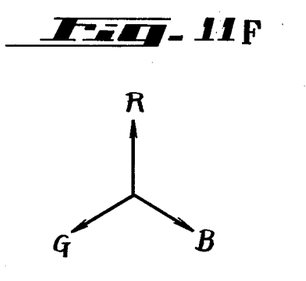
FIGS. 11F and 11G are diagrams showing the phase relation of the side band components.
Figure 11G:
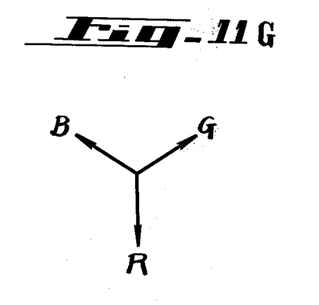

The subtracted output signal $S_{SBO}$ (or $S_{SBE}$) is fed to a delay circuit 44 to be delayed by one horizontal scanning line period 1H and then fed to an adder circuit 45 and a second subtracter circuit 46 which are supplied with the read-out signals $S_O$ and $S_E$ having bands which are not limited to carry out the signal treatments. As mentioned above, the adder circuit 45 is supplied with read-out signals $S_O$ and $S_E$ containing the frequency components shown in FIGS. 11A and 11B and the substracted signal is delayed by 1H from the signal $S_{SBO}$ (or $S_{SBE}$) shown in FIG. 11D. In this case, the phase relation of the side band components upon adding is taken into account. If the read-out signal $S_O$ obtained from the odd number horizontal scanning line 4a is taken as a reference, its phase is shown in FIG. 11A. However, the phase of the signal, delayed by 1H therefrom, is the same as that shown in FIG. 11B. That is, the phase relation between the above two signal components is just reversed. Therefore, when the two signal components are added together, the side band components $S_{SBO}$ and $S_{SBE}$ which are reversed in phase are cancelled. As a result, the output signal from the adder circuit is only the DC componets $S_{DO}$ (or $S_{DE}$) as shown by a solid line in FIG. 11E. It may be apparent that the above relation is same for both the odd and even number horizontal scanning lines.

As described above, if the read-out signals from the adjacent horizontal scanning lines are added in the adder circuit 45, the side band components are eliminated under the condition that vertical correlation exists. For this reason, the sampling error which may be caused by the existence of the side band components is entirely eliminated. Thus, expanding the band of the DC component $S_{DC}$ poses no problem.

The DC component obtained from the adder circuit 45 is fed to a matrix circuit 47. As described above, the second subtractor circuit 46 is supplied with signals like those applied to the adder 45. In this case, since the DC components is the same in phase throughout the adjacent horizontal scanning period, the side band components $S_{DO}$ and $S_{DE}$ are cancelled by subtracting them. However, the side band components $S_{SBO}$ and $S_{SBE}$ which contain color information are not cancelled. As a result, the side band components $S_{SBO}$ with the phase relation shown in FIG. 11F in the odd number horizontal scanning line, and the side band components $S_{SBE}$ with the phase relation shown in FIG. 11G in the even number horizontal scanning line are obtained respeccitively. If the side band components $S_{SBO}$ and $S_{SBE}$ are applied to detector 48 and 49 which are different in detecting axis, respectively, one of the detectors, for example, detector 48 detects the color component of $(R - (G + B/2))$ while the other detector 49 detects the color component of $(B - G)$. Accordingly, if these detected signals are fed to the matrix circuit 47 which is supplied with the signal of $(R + G + B)$ from the adder circuit 45, a desired video signal, for example, the luminance signal Y and color difference signals $(R - Y)$ and $(B - Y)$ in the NTSC system can be obtained at output terminals 50, 51 and 52 extend from the matrix circuit 47.

As described above, in the embodiment of the invention in FIG. 9, one special CCD 10 shown in FIG. 1 along with the color filter 40 shown in FIG. 10 are used, and the read out signals during the adjacent horizontal scanning periods are added utilizing the vertical phase relation to obtain a desired color video signal. In this case, even if the read out signals are added, their side band components are completely eliminated as described above. Therefore, the output signal obtained includes only the DC components and hence the occurrence of the sampling error is avoided. Thus, the reproduced picture is free from any flicker and hence is superior in quality.

Since the invention prevents the occurrence of sampling error, the band of the output signal can be expanded and consequently the resolution can be improved. By way of example, if the sampling frequency is selected as $\frac{1}{4} \tau_H$, the possible band width of the embodiment of the invention can be expanded to about $1.5 f_c$.

In the above embodiments of the invention, the 3-phase CCD having field storage is used, but this invention is not limited thereto. For example, a pickup device such as a photo diode array can be also used.

It will be apparent that many modifications and variations could be effected by one skilled in the art without departing from the spirits or scope of the novel concepts of the invention.

I claim as my invention:

1. A solid state camera comprising: A solid state image sensor having a plurality of picture elements arranged in both vertical and horizontal directions, the sensing position of said picture elements in each horizontal line of successive scanning being spaced from the sensing position of picture elements in adjacent horizontal lines of successive scanning by $\tau H/2$, where $\tau H$ is an alignment pitch of said picture elements in the horizontal direction, means for projecting an image on said solid state image sensor, means coupled to the picture elements for reading out the light information stored therein, and means for processing the output from said reading means to produce a resultant video signal.

2. A solid state camera in accordance with claim 1 wherein said picture sensing units comprise charge coupled devices formed on a semiconductor substrate.

3. A solid state camera in accordance with claim 1 wherein said means for processing the output of said reading includes a mixing means which includes an adder circuit and a delay means coupled to an output of the adder circuit for delaying signals received therefrom by one horizontal scanning line.

4. A solid state camera in accordance with claim 3 including a low pass filter means coupled to an output of said adder circuit, a subtracter means coupled to an output of said low pass filter, the high frequency components of the read-out signals being coupled from the adder circuit to said delay means, and the output of said delay means also coupled to said subtractor means.

5. A solid state camera in accordance with claim 1 wherein said means for processing the output of said reading means comprises: means for delaying the output of said reading means by one-half the reading cycle at every second horizontal scan line, means for mixing the resulting outputs of two adjacent horizontal scan lines, and means for deriving an output signal from said mixing means.

6. A solid state camera in accordance with claim 5 wherein said means for deriving an output signal from said mixing means includes substracter means for producing phase modulated color signals from image information of two adjacent horizontal scanning lines.

7. A solid state camera in accordance with claim 6 wherein said deriving means further includes detecter means for detecting color signals from said phase modulated color signals.

8. A solid state camera in accordance with claim 1 wherein said means for projecting an image on said picture sensing units includes color filter means for causing color components of an image only to be cast on predetermined picture sensing units.

9. A solid state camera in accordance with claim 8 wherein a plurality of color filter elements are used to cast an image on the picture sensing units at selected filter frequencies.

10. A solid state camera in accordance with claim 9 wherein said plurality of color filter elements in a certain horizontal scanning line are positioned to have a phase difference of 180° with respect to similar elements in the next adjacent horizontal scanning line.

* * * * *